US012283752B2

(12) United States Patent
Huang et al.

(10) Patent No.: US 12,283,752 B2
(45) Date of Patent: Apr. 22, 2025

(54) FREQUENCY RE-CONFIGURABLE ORBITAL ANGULAR MOMENTUM (OAM) ANTENNA WITH IN S BAND AND FREQUENCY RECONFIGURATION METHOD

(71) Applicant: Anhui University, Hefei (CN)

(72) Inventors: Zhixiang Huang, Hefei (CN); Sixian Qian, Hefei (CN); Jie Wu, Hefei (CN); Kaikun Niu, Hefei (CN); Yi Li, Hefei (CN); Shuyang An, Hefei (CN); Xingang Ren, Hefei (CN); Lixia Yang, Hefei (CN); Xianliang Wu, Hefei (CN)

(73) Assignee: Anhui University, Hefei (CN)

( * ) Notice: Subject to any disclaimer, the term of this patent is extended or adjusted under 35 U.S.C. 154(b) by 153 days.

(21) Appl. No.: 18/145,148

(22) Filed: Dec. 22, 2022

(65) Prior Publication Data

US 2023/0335920 A1 Oct. 19, 2023

(30) Foreign Application Priority Data

Apr. 13, 2022 (CN) ......................... 202210385152.2

(51) Int. Cl.
*H01Q 21/20* (2006.01)
*H01Q 9/04* (2006.01)

(52) U.S. Cl.
CPC ........... *H01Q 21/20* (2013.01); *H01Q 9/0414* (2013.01); *H01Q 9/0442* (2013.01)

(58) Field of Classification Search
CPC .. H01Q 1/50; H01Q 1/36; H01Q 1/38; H01Q 1/48; H01Q 15/24; H01Q 21/00;
(Continued)

(56) References Cited

U.S. PATENT DOCUMENTS 9,742,062 B2 * 8/2017 Park ..................... H01Q 9/0407

FOREIGN PATENT DOCUMENTS

| | | |
|---|---|---|
| CN | 106887718 A | 6/2017 |
| CN | 109149091 A | 1/2019 |
| CN | 111180885 A | 5/2020 |

OTHER PUBLICATIONS

Office Action mailed May 24, 2023 for Chinese Patent Application No. 202210385152.2, 10 pages. (Includes English translation).

* cited by examiner

*Primary Examiner* — Dimary S Lopez Cruz
*Assistant Examiner* — Anna N Hamadyk
(74) *Attorney, Agent, or Firm* — Sage Patent Group

(57) ABSTRACT

The present disclosure belongs to the technical field of OAM antennas, and provides a frequency re-configurable OAM antenna in S band and a frequency reconfiguration method. The OAM antenna includes a lower dielectric substrate and multiple array units. Each array unit includes a metal patch, an upper dielectric substrate, an outer loop, an inner loop, a coaxial feeder, four metal probes, and four diodes. In the present disclosure, bias states of all the diodes of each array unit are controlled by applying a voltage; when all the diodes are in forward bias states, the antenna works at a high frequency; and when all the diodes are in reverse bias states, the antenna works at a low frequency. The frequency re-configurable OAM antenna in S band in the present disclosure has features of frequency reconfiguration and two OAM radiation modes, and has a stable gain over a broadband.

16 Claims, 11 Drawing Sheets

(58) Field of Classification Search
CPC .... H01Q 21/0006; H01Q 3/26; H01Q 9/0457; H01Q 9/0407; H01Q 9/0442; H01Q 21/20; H01Q 9/0414; H01Q 5/314; H01Q 5/50; H01Q 23/00
See application file for complete search history.

FREQUENCY RE-CONFIGURABLE ORBITAL ANGULAR MOMENTUM (OAM) ANTENNA WITH IN S BAND AND FREQUENCY RECONFIGURATION METHOD

CROSS-REFERENCE TO RELATED APPLICATIONS

This patent application claims the benefit and priority of Chinese Patent Application No. 202210385152.2, filed on Apr. 13, 2022, the disclosure of which is incorporated by reference herein in its entirety as part of the present application.

TECHNICAL FIELD

The present disclosure belongs to the technical field of orbital angular momentum (OAM) antennas, and specifically relates to a frequency re-configurable OAM antenna in S band and a frequency reconfiguration method.

BACKGROUND ART

S band refers to a band of electromagnetic wave frequencies ranging from 2 GHz to 4 GHz, which is widely used. Radars, relays, measurement and control networks, and the like are all applied in S band. S band also has many advantages. A radar has many measurement elements, high precision, and desirable practicability. In addition, design of an S-band device usually uses multi-functional and multi-purpose antennas such as a multi-frequency antenna and a common-aperture antenna.

An OAM antenna is used as an antenna having an OAM, which generates an electromagnetic vortex wave because there is a rotation factor in front of an array. The OAM antenna transmits multiple mode signals simultaneously by using an orthogonal mode between electromagnetic vortex waves of different modes. Therefore, the OAM antenna may have different orthogonal modes. Because the orthogonal mode may theoretically change with a quantity of modes, and the quantity of modes may be any real number and does not have an upper limit, if an electromagnetic vortex wave is used to transmit a signal, a bandwidth may be increased unlimitedly under the condition of mode division multiplexing. In 2014, Q. Bai, A. Tennant, and B. Allen proposed a vortex wave antenna with eight array units arranged circularly. Each unit includes a micro-strip antenna. Radiation of an electromagnetic vortex wave is realized through feeding in such a manner that phases of adjacent radiation ports differ from each other by 45 degrees. The antenna implements five modes of 0, +1, −1, +2, and −2 through single-layer layout, but has only a single frequency. As a result, the bandwidth is relatively narrow.

SUMMARY

To overcome defects in the prior art, the present disclosure provides a frequency re-configurable OAM antenna in S band and a frequency reconfiguration method.

To achieve the above objective, the present disclosure provides the following technical solutions.

A frequency re-configurable OAM antenna in S band is provided, including: a lower dielectric substrate and multiple array units, where each of an upper surface and a lower surface of the lower dielectric substrate is provided with a metal copper clad region and a bare region; and the multiple array units are uniformly distributed in the bare region of the upper surface of the lower dielectric substrate in a circular array; and each array unit includes:

a metal patch, fixed in the bare region of the upper surface of the lower dielectric substrate;

an upper dielectric substrate, disposed opposite to the metal patch, where an air-layer space is formed between the upper dielectric substrate and the metal patch; and an upper surface of the upper dielectric substrate is provided with a metal copper clad region and a bare region;

an outer loop, fixed in the bare region of the upper dielectric substrate;

an inner loop, fixed in the outer loop;

a coaxial feeder, fixed in the lower dielectric substrate, where one end of the coaxial feeder is connected to the metal patch; and the other end of the coaxial feeder is connected to a metal floor and the metal copper clad region of the lower surface of the lower dielectric substrate;

four metal probes, fixed in the lower dielectric substrate, where one end of each metal probe is connected to the metal patch; and four diodes, fixed in the bare region of the lower surface of the lower dielectric substrate, where one end of each diode is connected to a metal probe at a corresponding position; and the other end of the diode is connected to the metal copper clad region of the lower surface of the lower dielectric substrate.

Preferably, a quantity of the array units is eight;

the eight array units are distributed centro-symmetrically by taking a center of the circular array as a symmetrical rotation center;

the eight array units are rotated clockwise or counter-clockwise by angles that sequentially increase by 45 degrees; and an included angle between a central axis of the circular array and a central axis of an array unit on the central axis of the circular array is 90 degrees.

Preferably, the four metal probes in each array unit are symmetrically distributed by taking a median of the metal patch as an axis.

Preferably, the four diodes in each array unit are symmetrically distributed by taking a median of the metal patch as an axis.

Preferably, a radius R of the circular array is a distance between a center of the circular array and any array unit, and is greater than or equal to 0.6λ, where λ is a wavelength at a central frequency in a free space.

Preferably, a height of the air-layer space is 5 mm.

Preferably, a copper thickness of the metal copper clad region is 18 microns or 35 microns.

Preferably, the lower dielectric substrate and the multiple upper dielectric substrates are all made of boards Rogers 5880;

a thickness of each upper dielectric substrate is 3.048 mm; and a thickness of the lower dielectric substrate is 3.175 mm.

A frequency reconfiguration method for the frequency re-configurable OAM antenna in S band is provided, including the following step:

applying a voltage to control bias states of all the diodes of each array unit, where when all the diodes of each array unit are in forward bias states, equivalent resistors are connected between the four metal probes of the array unit and the metal floor, and the antenna works at a high frequency; and when all the diodes of each array unit are in reverse bias states, equivalent capacitors are connected between the four metal probes of the array unit and the metal floor, and the antenna works at a low frequency.

The frequency re-configurable OAM antenna in S band and the frequency reconfiguration method provided in the present disclosure have following beneficial effects: 1. Owing to the feature of frequency reconfiguration in the present disclosure, switching between two frequencies can be realized, and the OAM antenna can work at two frequency bands. 2. A bandwidth can be increased by using a simple parasitic structure in the present disclosure. 3. Two modes of OAM are realized by using multiple array units that are uniformly distributed in a circular array. A greater quantity of the array units indicates a greater quantity of modes of OAM that can be implemented.

BRIEF DESCRIPTION OF THE DRAWINGS

To describe the embodiments of the present disclosure and the design schemes of the embodiments more clearly, the accompanying drawings required for describing the embodiments are briefly introduced below. The accompanying drawings in the following description show merely some embodiments of the present disclosure, and other drawings may be derived from these accompanying drawings by a person of ordinary skill in the art without creative efforts.

FIG. 12*a* is a diagram of radiation at frequency 2.61 GHz in mode +1; FIG. 12*b* is a diagram of radiation at frequency 2.61 GHz in mode +2; FIG. 12*c* is a diagram of radiation at frequency 3.55 GHz in mode +1; and FIG. 12*d* is a diagram of radiation at frequency 3.55 GHz in mode +2.

Figure 1:
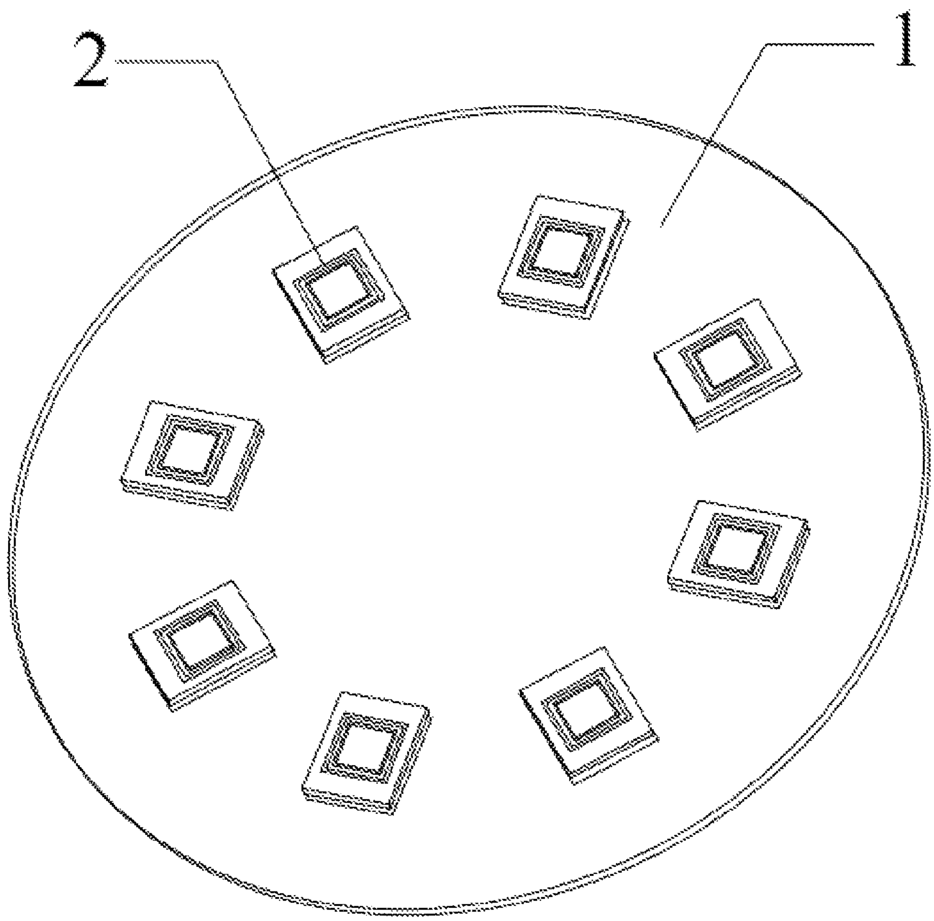
FIG. 1 is a schematic structural diagram of a frequency re-configurable OAM antenna in S band according to Embodiment 1 of the present disclosure.

Reference numerals in the accompanying drawings are as follows:

1: lower dielectric substrate; 2: array unit; 201: metal patch; 202: upper dielectric substrate; 203: coaxial feeder; 204: metal probe; 205: diode; 206: outer loop; 207: inner loop.

DETAILED DESCRIPTION OF THE EMBODIMENTS

To enable those skilled in the art to better understand and implement the technical solutions of the present disclosure, the present disclosure is described below in detail with reference to the accompanying drawings and specific embodiments. The following embodiments are only used for describing the technical solutions of the present disclosure more clearly, and are not intended to limit the protection scope of the present disclosure.

In the description of the present disclosure, it should be noted that orientation or position relationships indicated by terms such as “central”, “longitudinal”, “transverse”, “length”, “width”, “thickness”, “upper”, “lower”, “front”, “rear”, “left”, “right”, “vertical”, “horizontal”, “top”, “bottom”, “inner”, “outer”, “axial”, “radial”, and “circumferential” are orientation or position relationships based on the accompanying drawings, and are to facilitate a simple description of the technical solutions of the present disclosure only, rather than to indicate or imply that the mentioned apparatus or element must have the specific orientation or be constructed and operated in the specific orientation. Therefore, these terms cannot be construed as a limitation to the present disclosure.

Moreover, terms such as “first” and “second” are merely intended for the purpose of description, and should not be construed as indicating or implying relative importance. In the description of the present disclosure, it should be noted that, unless otherwise clearly specified or limited, meanings of terms “connected to each other” and “connected to” should be understood in a broad sense. For example, a connection may be a fixed connection, a detachable connection, an integrated connection, a mechanical connection, an electrical connection, a direct connection or an indirect connection through an intermediation. Those of ordinary skill in the art may understand specific meanings of the above terms in the present disclosure based on specific situations. In the description of the present disclosure, unless otherwise specified, “multiple” means two or more. Details are not described herein again.

Embodiment 1

Figure 2:
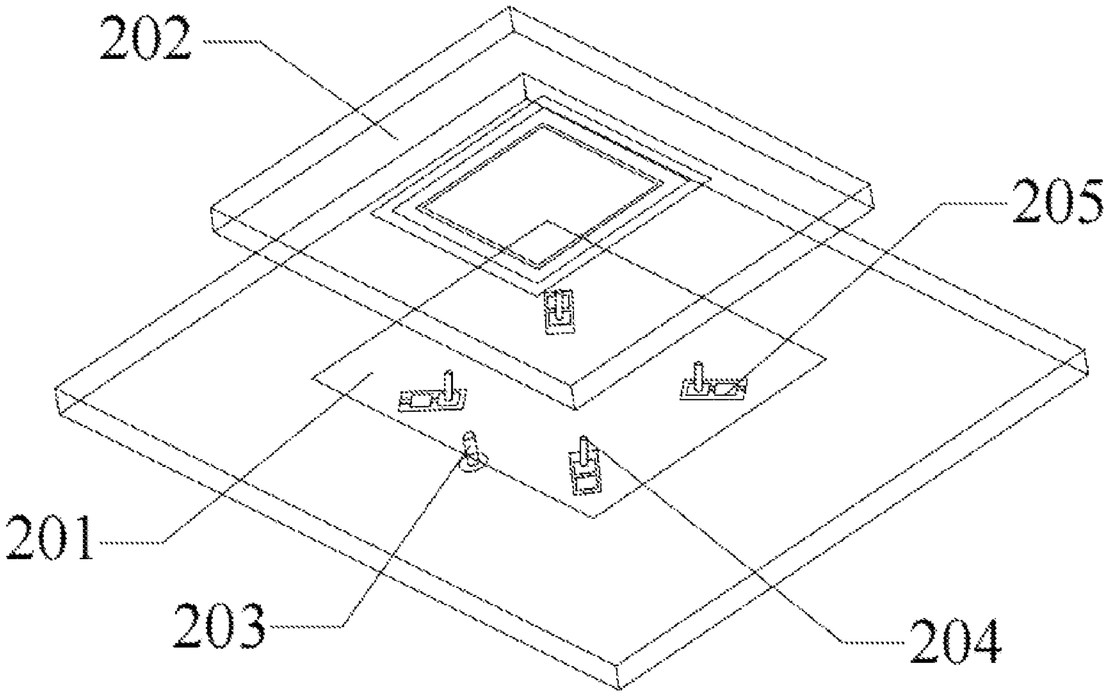
FIG. 2 is a schematic structural diagram of an array unit according to Embodiment 1 of the present disclosure.
Figure 3:
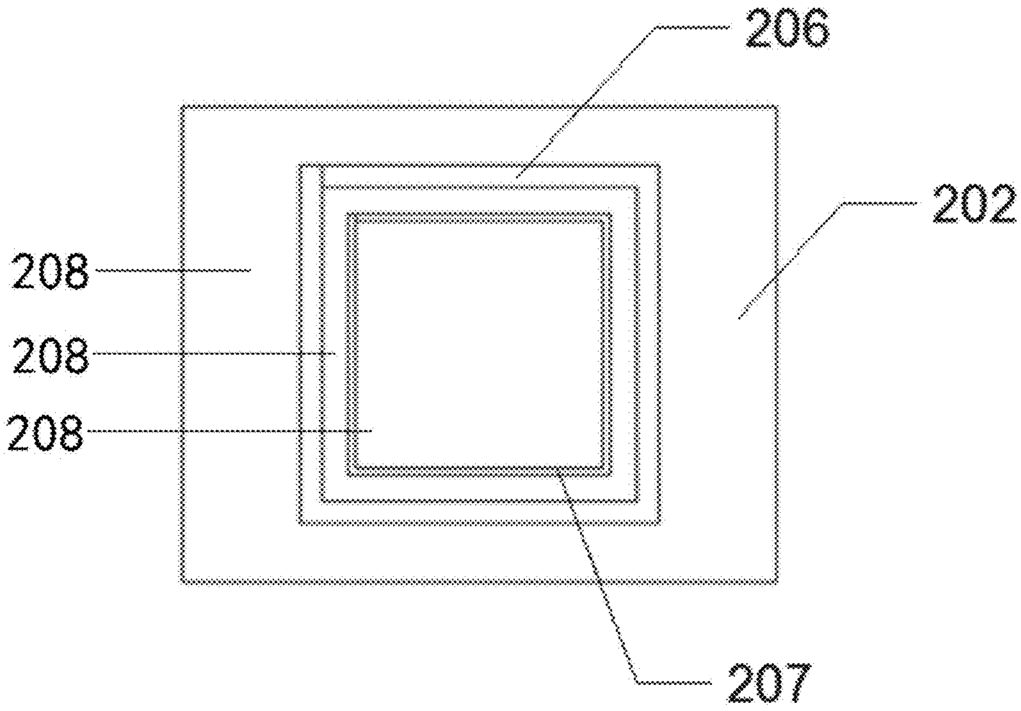
FIG. 3 is a schematic diagram of a connection between an inner loop and an outer loop according to Embodiment 1 of the present disclosure.
Figure 4:
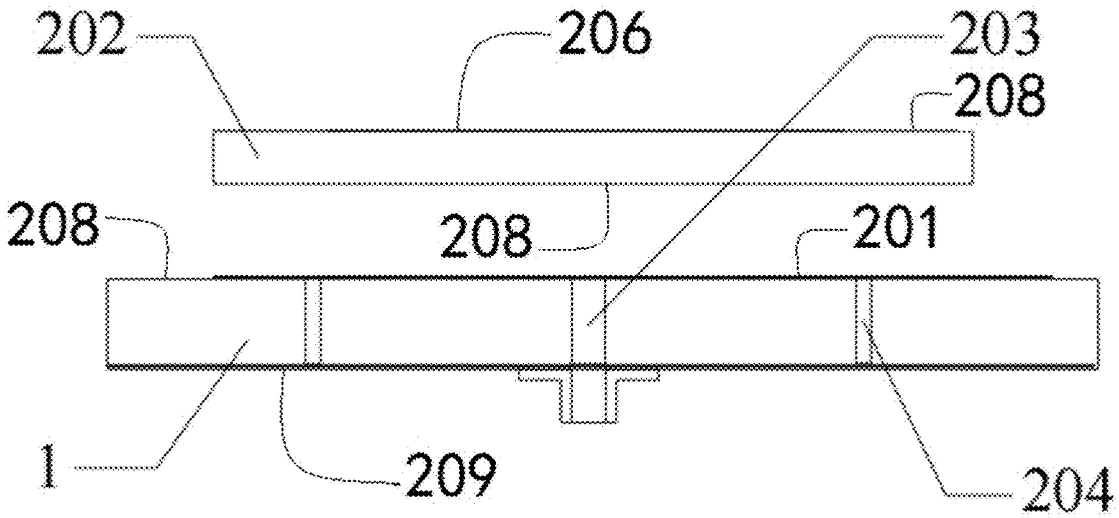
FIG. 4 is a schematic structural diagram of four metal probes and a coaxial feeder according to Embodiment 1 of the present disclosure.

Referring to FIG. 1, a frequency re-configurable OAM antenna in S band includes a lower dielectric substrate 1 and multiple array units 2. Each of an upper surface and a lower surface of the lower dielectric substrate 1 is provided with a metal copper clad region 209 and a bare region 208. The multiple array units 2 are uniformly distributed in the bare region 208 of the upper surface of the lower dielectric substrate 1 in a circular array. Referring to FIG. 2, each array unit 2 includes a metal patch 201, an upper dielectric substrate 202, an outer loop 206, an inner loop 207, a coaxial feeder 203, four metal probes 204, and four diodes 205. The metal patch 201 is fixed in the bare region 208 of the upper surface of the lower dielectric substrate 1. Referring to FIG. 4, the upper dielectric substrate 202 is disposed opposite to the metal patch 201. An air-layer space is formed between the upper dielectric substrate 202 and the metal patch 201. An upper surface of the upper dielectric substrate 202 is provided with a metal copper clad region 209 and a bare region 208. The outer loop 206 is fixed in the bare region 208 of the upper dielectric substrate 202. Referring to FIG. 3, the inner loop 207 is fixed in the outer loop 206. The coaxial feeder 203 is fixed in the lower dielectric substrate 1. One end of the coaxial feeder 203 is connected to the metal patch 201. The other end of the coaxial feeder 203 is connected to metal copper clad region 209 of the lower surface of the lower dielectric substrate 1. The four metal probes 204 are fixed in the lower dielectric substrate 1. One end of each metal probe 204 is connected to the metal patch 201. The four diodes 205 are fixed in the bare region 208 of the lower surface of the lower dielectric substrate 1. One end of each diode 205 is connected to a metal probe 204 at a corresponding position. The other end of the diode 205 is connected to the metal copper clad region 209 of the lower surface of the lower dielectric substrate 1.

Figure 5:
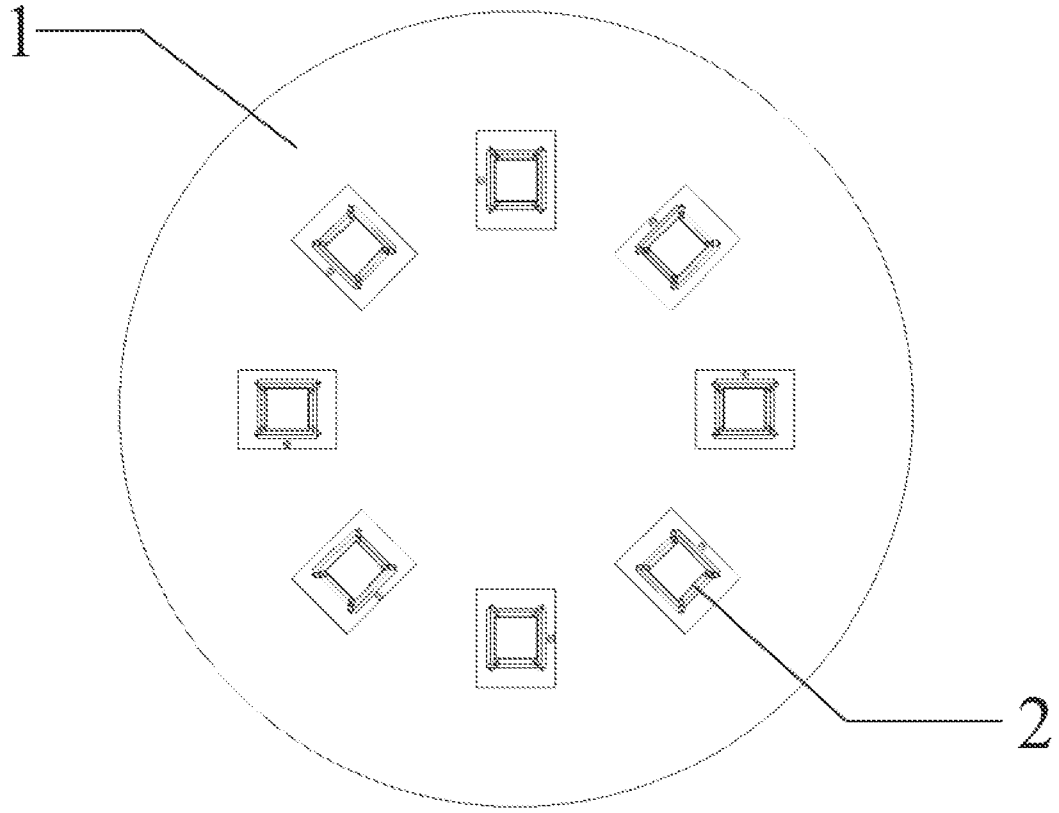
FIG. 5 is a top view of a frequency re-configurable OAM antenna in S band according to Embodiment 1 of the present disclosure.
Figure 6:
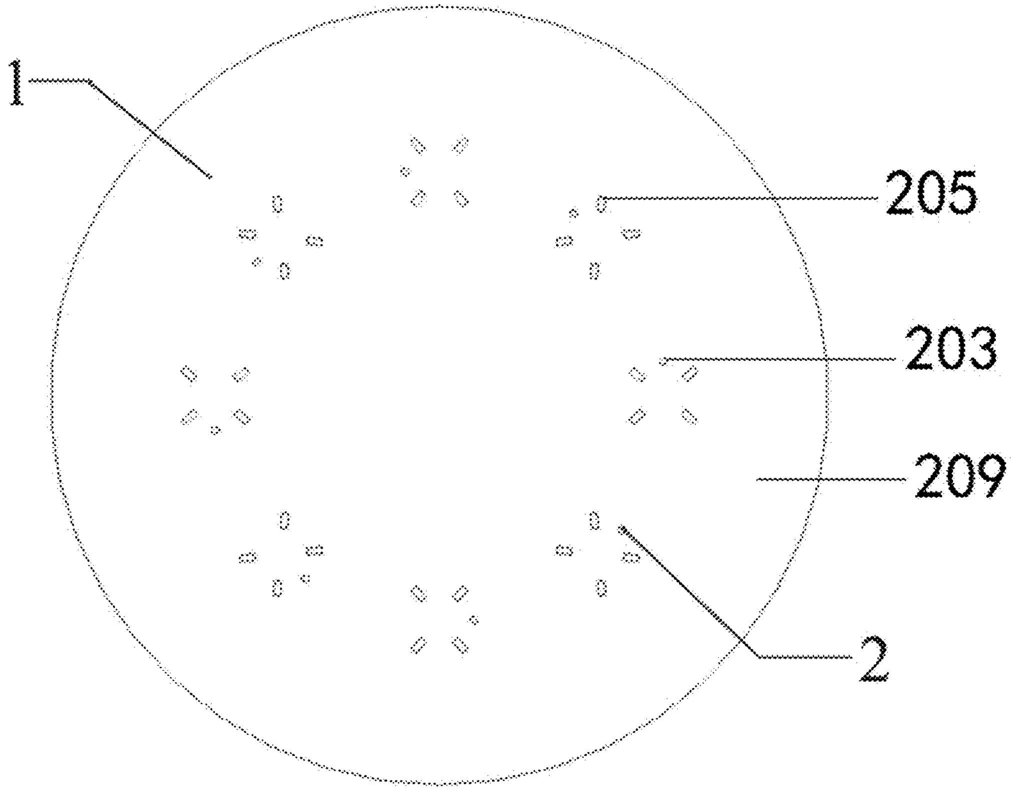
FIG. 6 is a rear view of a frequency re-configurable OAM antenna in S band according to Embodiment 1 of the present disclosure.

In this embodiment, the outer loop 206 is 24.4 mm long and 3 mm wide; and the inner loop 207 is 17.8 mm long and 1 mm wide. Referring to FIG. 5 and FIG. 6, a quantity of the array units 2 is eight. The eight array units 2 are distributed centro-symmetrically by taking a center of the circular array as a symmetrical rotation center. The eight array units 2 are rotated clockwise or counterclockwise by angles that sequentially increase by 45 degrees. An included angle between a central axis of the circular array and a central axis of an array unit 2 on the central axis of the circular array is 90 degrees. A distance between a center of each metal patch 201 and a circle center of the lower dielectric substrate is 94 mm. The four metal probes 204 in each array unit 2 are symmetrically distributed by taking a median of the metal patch 201 as an axis. An area of the metal patch 201 is 40.8 mm*32.96 mm. The four diodes 205 in each array unit 2 are symmetrically distributed by taking a median of the metal patch 201 as an axis. A radius R of the circular array is a distance between a center of the circular array and any array unit 2, and is greater than or equal to 0.6λ, where λ is a wavelength at a central frequency in a free space. A height of the air-layer space is 5 mm. A copper thickness of the metal copper clad region 209 is 18 microns or 35 microns. The lower dielectric substrate 1 and the multiple upper dielectric substrates 202 are all made of boards Rogers 5880. Each upper dielectric substrate 202 has a thickness of 3.048 mm, a width W of 40.5 mm, a length L of 32.4 mm, a relative dielectric constant of 2.2, and a loss tangent tan δ of 0.0009. The lower dielectric substrate 1 has a thickness of 3.175 mm, a relative dielectric constant of 2.2, a loss tangent tan δ of 0.0009, and a radius of 163.2 mm. A model of the diodes 205 is BAR64-02V.

A frequency reconfiguration method for the frequency re-configurable OAM antenna in S band includes the following step: applying a voltage to control bias states of all the diodes 205 of each array unit (2), where when all the diodes 205 of each array unit 2 are in forward bias states, equivalent resistors are connected between the four metal probes 204 of the array unit 2 and the metal floor, and the antenna works at a high frequency; and when all the diodes 205 of each array unit 2 are in reverse bias states, equivalent capacitors are connected between the four metal probes 204 of the array unit 2 and the metal floor, and the antenna works at a low frequency. In this embodiment, work frequencies of the antenna are 2.61 GHz and 3.55 GHz that cover two frequency ranges: 2.56 GHz to 2.83 GHz and 3.34 GHz to 3.68 GHz. Therefore, a relative bandwidth exceeds 10%, which meets a requirement of a broadband.

Figure 7:
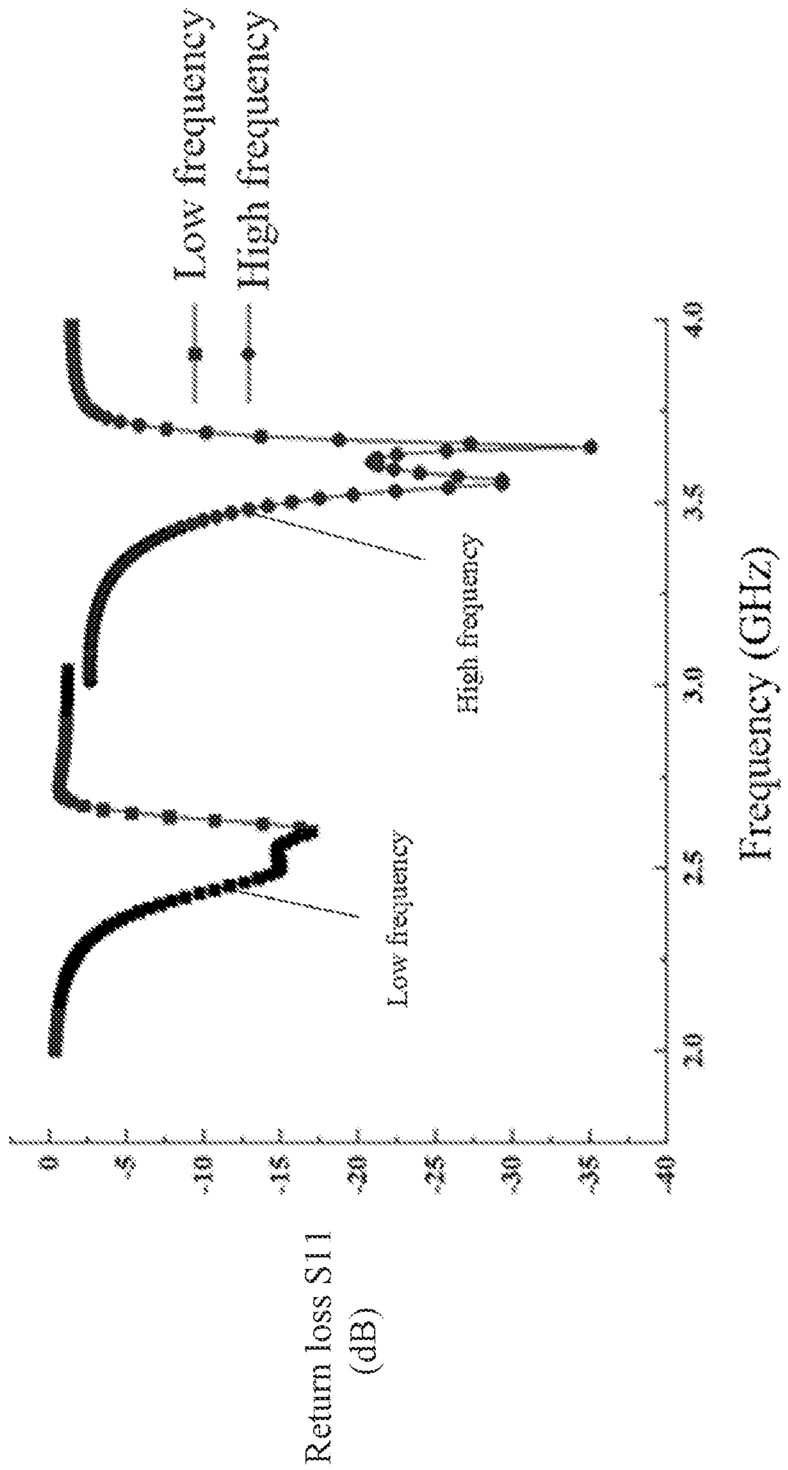
FIG. 7 is a schematic diagram of parameters of return loss according to Embodiment 1 of the present disclosure.

FIG. 7 shows a simulation result of a reflection coefficient of the present disclosure in an experiment. The result shows that the frequency re-configurable OAM antenna in S band has two adjustable work frequencies. The antenna works at frequencies 2.61 GHz and 3.55 GHz that cover two bandwidth ranges: 2.56 GHz to 2.79 GHz and 3.34 GHz to 3.68 GHz.

Figure 8:
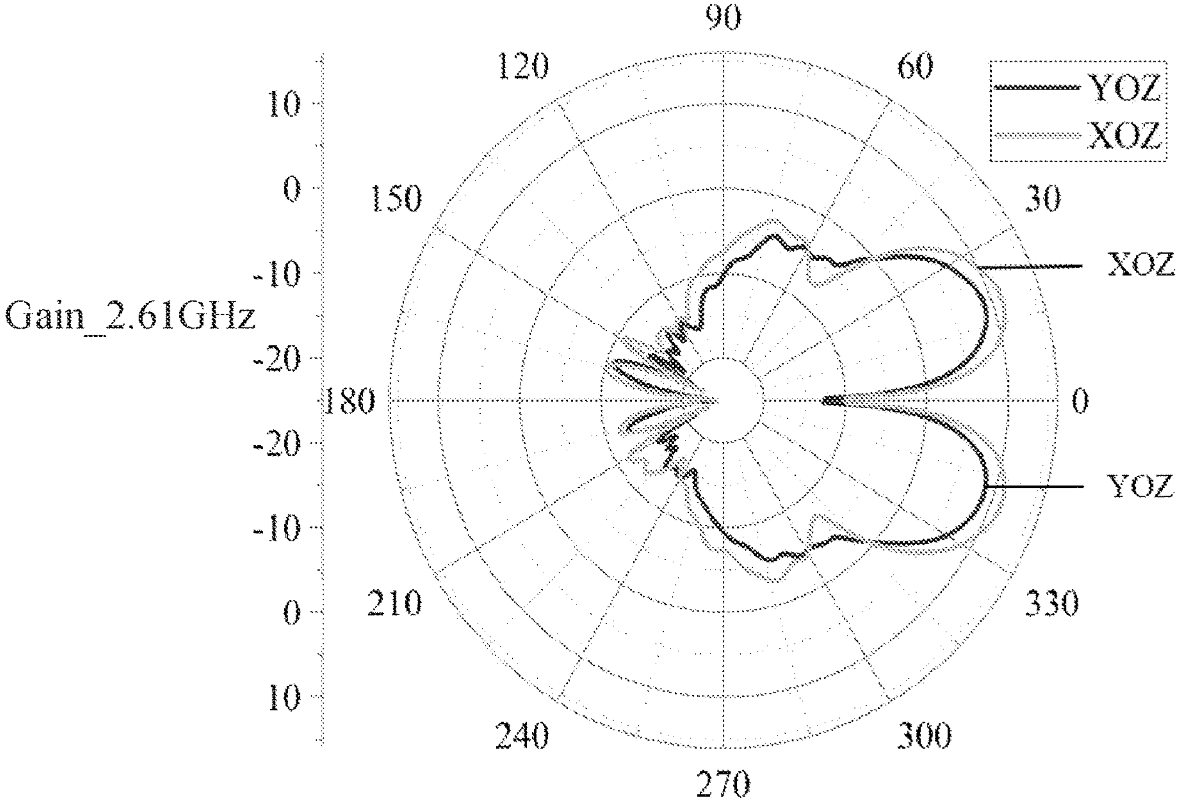
FIG. 8 is a diagram of radiation at frequency 2.61 GHz in mode +1 according to Embodiment 1 of the present disclosure.
Figure 9:
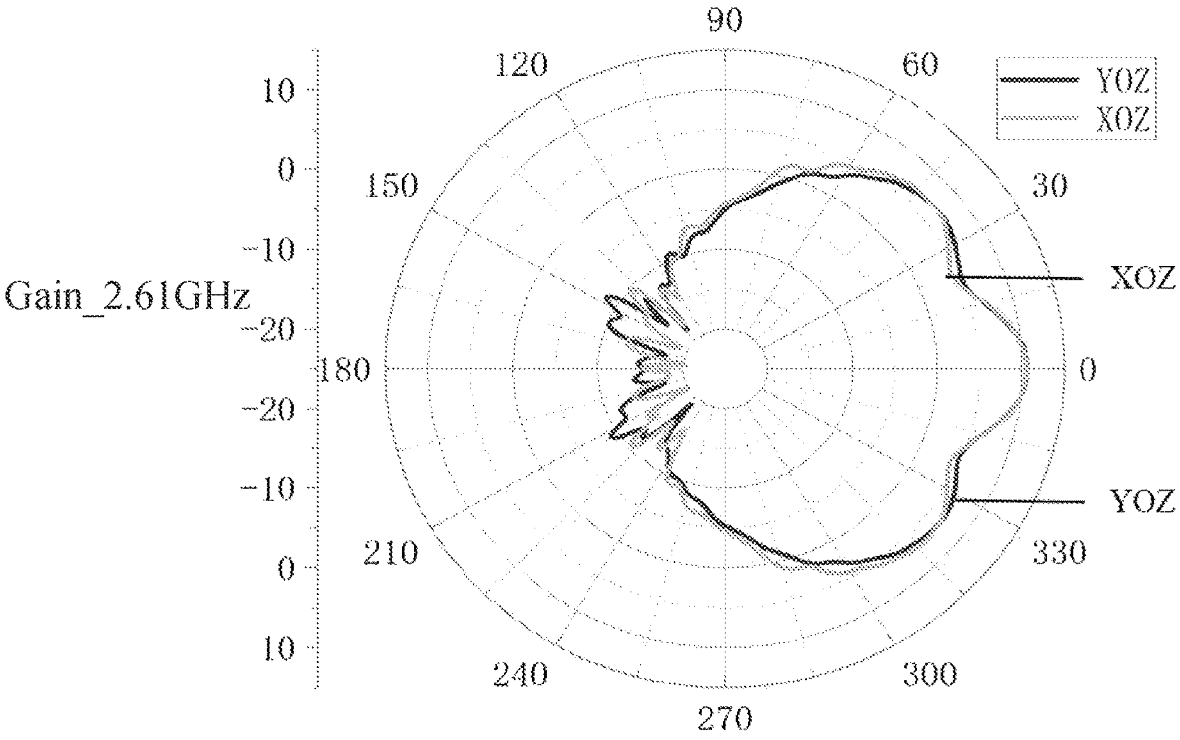
FIG. 9 is a diagram of radiation at frequency 2.61 GHz in mode +2 according to Embodiment 1 of the present disclosure.
Figure 10:
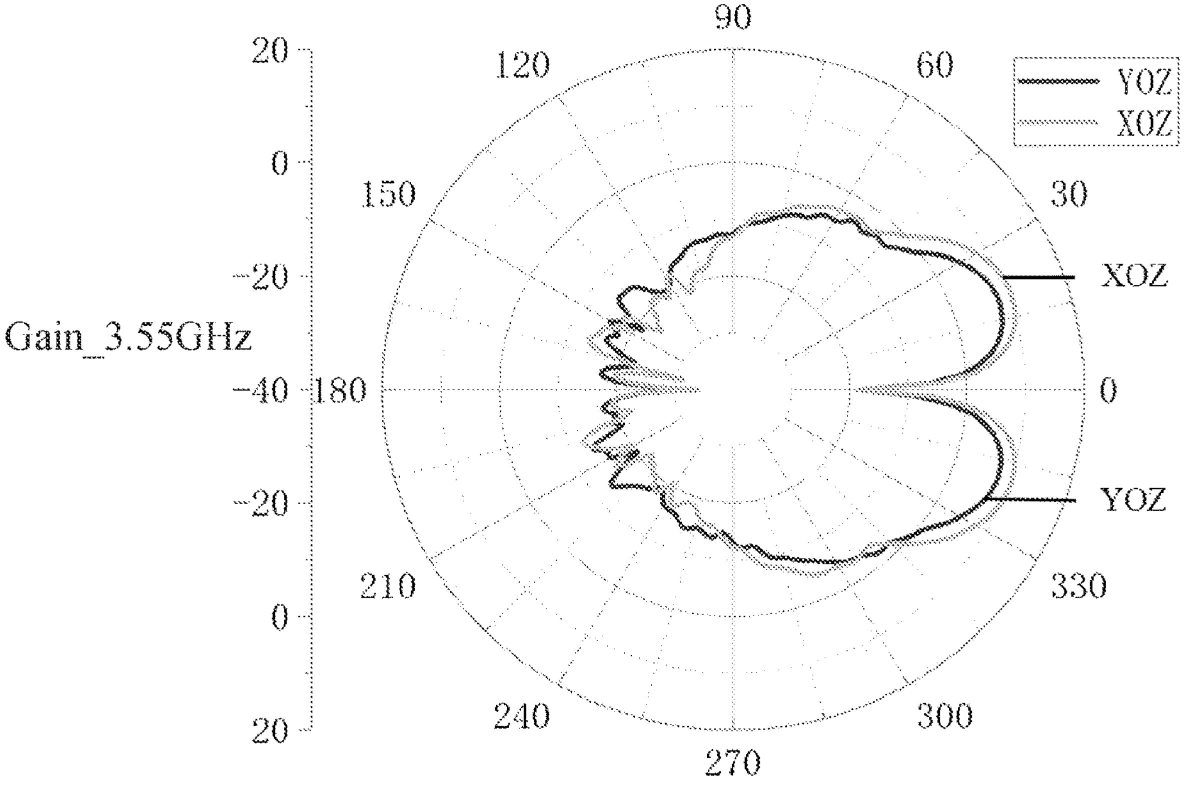
FIG. 10 is a diagram of radiation at frequency 3.55 GHz in mode +1 according to Embodiment 1 of the present disclosure.
Figure 11:
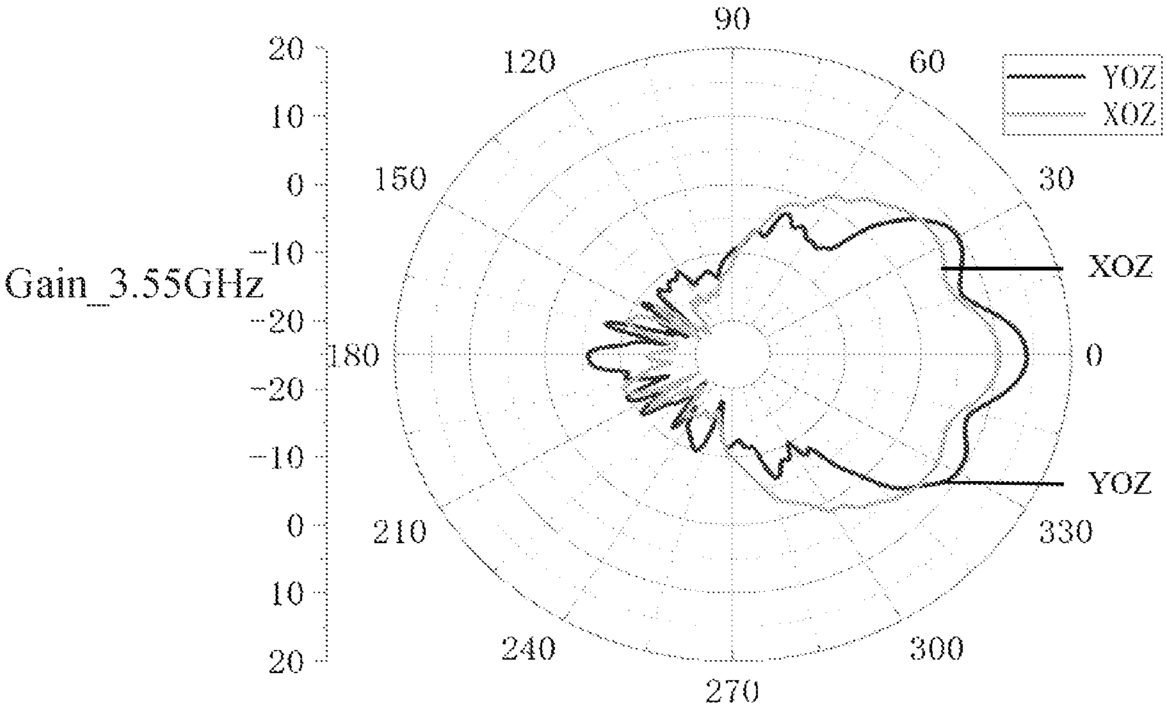
FIG. 11 is a diagram of radiation at frequency 3.55 GHz in mode +2 according to Embodiment 1 of the present disclosure.

FIG. 8 to FIG. 11 show antenna radiation patterns of an XOZ side and a YOZ side of the OAM antenna in an experiment. It can be learned that the OAM antenna can work normally at two frequencies, generate directional radiation in two modes, and radiate electromagnetic vortex waves in four effective modes. FIG. 8 shows a working status of the OAM antenna at frequency 2.61 GHz in mode +1. FIG. 9 shows a working status of the OAM antenna at frequency 2.61 GHz in mode +2. FIG. 10 shows a working status of the OAM antenna at frequency 3.55 GHz in mode +1. FIG. 11 shows a working status of the OAM antenna at frequency 3.55 .GHz in mode +2.

Figures 12A, 12B, 12C, 12D:
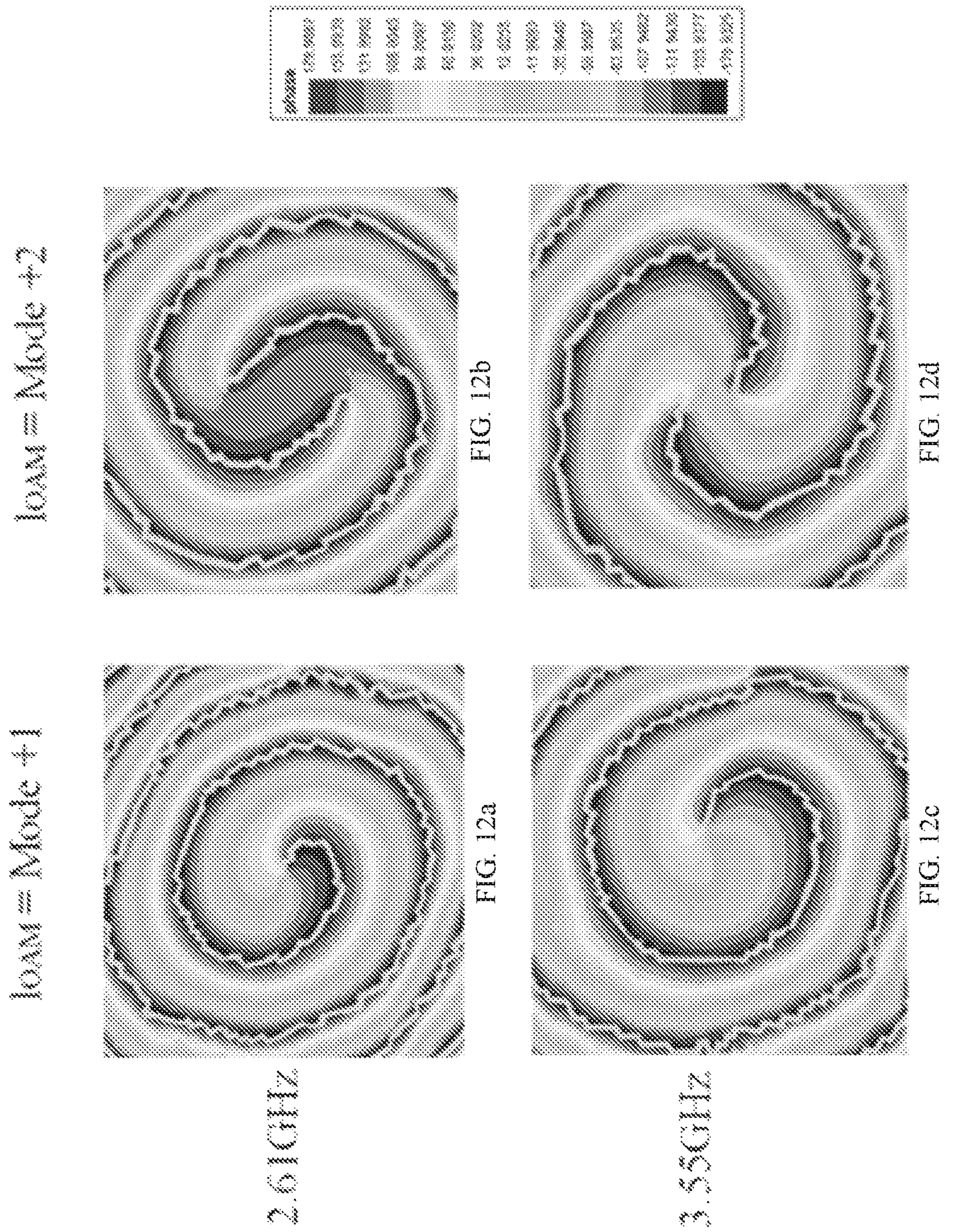
FIGS. 12*a*-12*d* show diagrams of phases at frequencies 2.61 GHz and 3.55 GHz in different modes according to Embodiment 1 of the present disclosure; where

FIGS. 12*a*-12*d* show phases of the OAM antenna at different frequencies in an experiment. FIG. 12*a* is a diagram of radiation at frequency 2.61 GHz in mode +1. FIG. 12*b* is a diagram of radiation at frequency 2.61 GHz in mode +2. FIG. 12*c* is a diagram of radiation at frequency 3.55 GHz in mode +1. FIG. 12*d* is a diagram of radiation at frequency 3.55 GHz in mode +2. It can be learned that from the above figures that, the OAM antenna generates an electromagnetic wave of a spiral-phase structure, which shows an excellent characteristic of a vortex wave.

The above embodiments are only preferred specific embodiments of the present disclosure, and the protection scope of the present disclosure is not limited to this. All simple variations or equivalent substitutions of the technical solutions apparently obtained by any person skilled in the art within the technical scope disclosed by the present disclosure shall fall within the protection scope of the present disclosure.

What is claimed is:

1. A frequency re-configurable orbital angular momentum (OAM) antenna in S band, comprising: a lower dielectric substrate and multiple array units, wherein each of an upper surface and a lower surface of the lower dielectric substrate is provided with a metal copper clad region and a bare region; and the multiple array units are uniformly distributed in the bare region of the upper surface of the lower dielectric substrate in a circular array; and each array unit comprises:

a metal patch, fixed in the bare region of the upper surface of the lower dielectric substrate;

an upper dielectric substrate, disposed opposite to the metal patch, wherein an air-layer space is formed between the upper dielectric substrate and the metal patch; and an upper surface of the upper dielectric substrate is provided with a metal copper clad region and a bare region;

an outer loop, fixed in the bare region of the upper dielectric substrate;

an inner loop, fixed in the outer loop;

a coaxial feeder, fixed in the lower dielectric substrate, wherein one end of the coaxial feeder is connected to the metal patch; and the other end of the coaxial feeder is connected to the metal copper clad region of the lower surface of the lower dielectric substrate;

four metal probes, fixed in the lower dielectric substrate, wherein one end of each metal probe is connected to the metal patch; and four diodes, fixed in the bare region of the lower surface of the lower dielectric substrate, wherein one end of each diode is connected to a metal probe at a corresponding position; and the other end of the diode is connected to the metal copper clad region of the lower surface of the lower dielectric substrate.

2. The frequency re-configurable OAM antenna in S band according to claim 1, wherein a quantity of the array units is eight;

the eight array units are distributed centro-symmetrically by taking a center of the circular array as a symmetrical rotation center;

the eight array units are rotated clockwise or counter-clockwise by angles that sequentially increase by 45 degrees; and an included angle between a central axis of the circular array and a central axis of an array unit on the central axis of the circular array is 90 degrees.

3. The frequency re-configurable OAM antenna in S band according to claim 1, wherein the four metal probes in each array unit are symmetrically distributed by taking a median of the metal patch as an axis.

4. The frequency re-configurable OAM antenna in S band according to claim 1, wherein the four diodes in each array unit are symmetrically distributed by taking a median of the metal patch as an axis.

5. The frequency re-configurable OAM antenna in S band according to claim 1, wherein a radius R of the circular array is a distance between a center of the circular array and any array unit, and is greater than or equal to 0.6λ, wherein λ is a wavelength at a central frequency in a free space.

6. The frequency re-configurable OAM antenna in S band according to claim 1, wherein a height of the air-layer space is 5 mm.

7. The frequency re-configurable OAM antenna in S band according to claim 1, wherein a copper thickness of the metal copper clad region is 18 microns or 35 microns.

8. The frequency re-configurable OAM antenna in S band according to claim 1, wherein the lower dielectric substrate and the multiple upper dielectric substrates are all made of Rogers board 5880;

a thickness of each upper dielectric substrate is 3.048 mm; and a thickness of the lower dielectric substrate is 3.175 mm.

9. A frequency reconfiguration method for the frequency re-configurable OAM antenna in S band according to claim 1, comprising the following step:

applying a voltage to control bias states of all the diodes of each array unit, wherein when all the diodes of each array unit are in forward bias states, equivalent resistors are connected between the four metal probes of the array unit and the metal copper clad region of the lower surface of the lower dielectric substrate and the antenna works at a high frequency; and when all the diodes of each array unit are in reverse bias states, equivalent capacitors are connected between the four metal probes of the array unit and the metal copper clad region of the lower surface of the lower dielectric substrate and the antenna works at a low frequency.

10. The frequency reconfiguration method according to claim 9, wherein a quantity of the array units is eight;

the eight array units are distributed centro-symmetrically by taking a center of the circular array as a symmetrical rotation center;

the eight array units are rotated clockwise or counter-clockwise by angles that sequentially increase by 45 degrees; and an included angle between a central axis of the circular array and a central axis of an array unit on the central axis of the circular array is 90 degrees.

11. The frequency reconfiguration method according to claim 9, wherein the four metal probes in each array unit are symmetrically distributed by taking a median of the metal patch as an axis.

12. The frequency reconfiguration method according to claim 9, wherein the four diodes in each array unit are symmetrically distributed by taking a median of the metal patch as an axis.

13. The frequency reconfiguration method according to claim 9, wherein a radius R of the circular array is a distance between a center of the circular array and any array unit, and is greater than or equal to 0.6λ, wherein λ is a wavelength at a central frequency in a free space.

14. The frequency reconfiguration method according to claim 9, wherein a height of the air-layer space is 5 mm.

15. The frequency reconfiguration method according to claim 9, wherein a copper thickness of the metal copper clad region is 18 microns or 35 microns.

16. The frequency reconfiguration method according to claim 9, wherein the lower dielectric substrate and the multiple upper dielectric substrates are all made of Rogers board 5880;

a thickness of each upper dielectric substrate is 3.048 mm; and a thickness of the lower dielectric substrate is 3.175 mm.

* * * * *